United States Patent [19]
Zeiner et al.

[11] Patent Number: 4,616,070
[45] Date of Patent: Oct. 7, 1986

[54] THERMOPLASTIC MOLDING MATERIALS

[75] Inventors: Hartmut Zeiner, Plankstadt; Gerhard Heinz, Weisenheim; Peter Neumann, Wiesloch; Juergen Fischer, Ludwigshafen; Dietmar Nissen, Heidelberg, all of Fed. Rep. of Germany

[73] Assignee: BASF Aktiengesellschaft, Ludwigshafen, Fed. Rep. of Germany

[21] Appl. No.: 733,048

[22] Filed: May 8, 1985

[30] Foreign Application Priority Data

May 8, 1984 [DE] Fed. Rep. of Germany ....... 3416856

[51] Int. Cl.$^4$ ............................................. C08G 65/48
[52] U.S. Cl. .................................. 525/390; 525/534; 525/535; 525/419; 525/471; 525/394; 525/397; 525/437; 525/462; 264/331.11; 264/331.19; 264/345; 264/346

[58] Field of Search ............... 525/390, 534, 535, 471, 525/419, 397, 437, 394, 462; 264/331.11, 331.19, 345, 346

[56] References Cited

U.S. PATENT DOCUMENTS 4,293,670 10/1981 Robeson et al. .................... 525/436

Primary Examiner—Melvyn I. Marquis
Attorney, Agent, or Firm—Keil & Weinkauf

[57] ABSTRACT

Thermoplastic molding materials containing a mixture of
A. a heat-stable polymer, e.g. a polyether sulfone or polysulfone, which does not contain any reactive groups, and
B. a heat-stable polymer which contains reactive groups, preferably nitrile or thioaryl groups and/or sulfur bridges, can be processed to moldings, which can be crosslinked, for example by being heated at above 200° C., so that the plastic matrix becomes virtually insoluble.

8 Claims, No Drawings

THERMOPLASTIC MOLDING MATERIALS

The present invention relates to thermoplastic molding materials which contain a mixture of a heat-stable thermoplastic and a heat-stable thermoplastic containing reactive groups.

Moldings of amorphous heat-stable thermoplastics are not resistant to solvents or to stress cracking, and this is a disadvantage when they are used in the automotive sector. The incorporation of comonomers carrying reactive groups into the thermoplastics in order to produce solvent-resistant branched polymers has already been proposed. However, the incorporation of comonomers results in an involved and expensive procedure for the preparation of the thermoplastics.

It is an object of the present invention to provide, in a simple manner, crosslinkable thermoplastic molding materials based on heat-stable polymers.

We have found that this object is achieved by the molding material according to the invention, this material containing a mixture of A. from 1 to 99, preferably from 20 to 90, in particular from 50 to 90, % by weight of an amorphous thermoplastic polymer which does not contain any reactive groups and has a glass transition temperature above 80° C., preferably above 130° C., and B. from 99 to 1, preferably from 10 to 80, in particular from 10 to 50, % by weight of a thermoplastic polymer which contains reactive groups and has a glass transition temperature above 80° C., preferably above 130° C.

Particularly suitable polymers A are amorphous polymers, preferably polyether sulfones

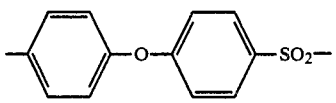

polysulfones

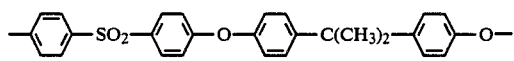

polyetherimides

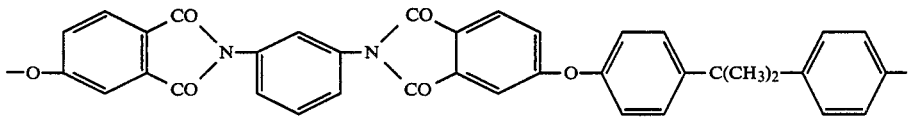

polycarbonates, aromatic polyesters and aromatic polyethers.

These are amorphous, thermoplastic polymers which are soluble in Low-boiling organic solvents and have a glass transition temperature above 80° C., preferably above 100° C., in particular above 130° C.

In principle, the polymers A employed may also be partially crystalline thermoplastic polymers preferably having a melting point greater than 200° C., eg. polyether ketones or nylons.

The polymers B are thermoplastic polymers having a glass transition temperature above 80° C., preferably above 100° C., in particular above 130° C. They are preferably likewise amorphous and soluble in organic solvents, and in some cases even possess sufficient solubility in fairly high boiling polar solvents, such as dimethyl sulfoxide or N-methylpyrrolidone. The polymers B contain one or more reactive groups, for example a nitrile, arylthio or alkylthio group, or the —S— or =N— group.

Arylthio is the —S—R group in which R is unsubstituted or substituted aryl, eg. phenyl, naphthyl or pyridyl, which can carry, for example, halogen, alkyl, alkoxy, cyano or aryl substituents. Alkylthio is the —S—R' group in which R' is alkyl of 1 to 6 carbon atoms, aryl or benzyl which is unsubstituted or substituted by halogen, alkyl, alkoxy or cyano.

Preferred polymers B are aromatic polyethers which carry nitrile groups and/or sulfur bridges and/or arylthio or alkylthio groups as reactive groups, for example thermoplastic polyethers based on, preferably, dinuclear bisphenols and aromatic dihalo compounds.

Preferred bisphenols are bisphenol T

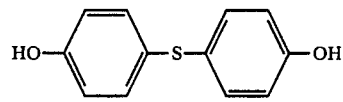

and bisphenol A

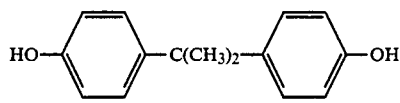

Other suitable compounds are

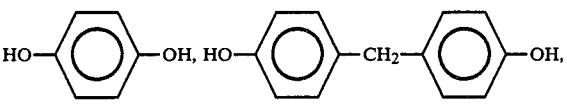

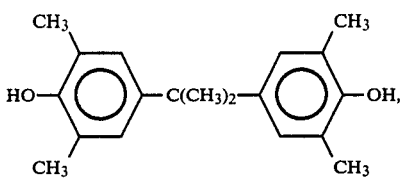

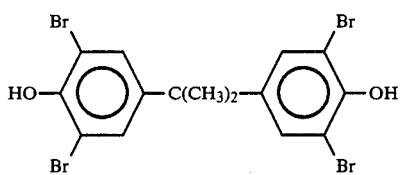

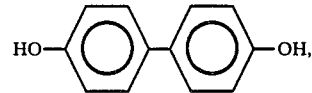

-continued

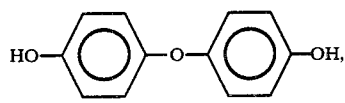

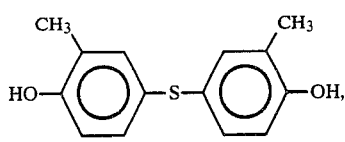

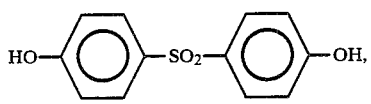

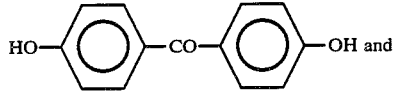

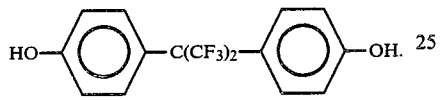

Preferred dihalo compounds are benzene, pyridine, pyridazine, pyrimidine, pyrazine and thiophene derivatives which carry two or more chlorine or fluorine atoms and also one or more nitrile, arylthio or alkylthio groups; particularly preferred compounds are mononuclear dichloro and difluoro derivatives of the following aromatic compounds:

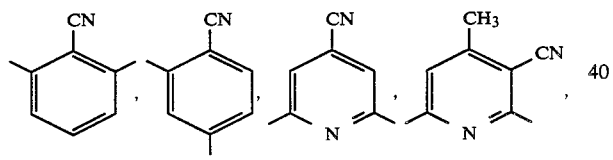

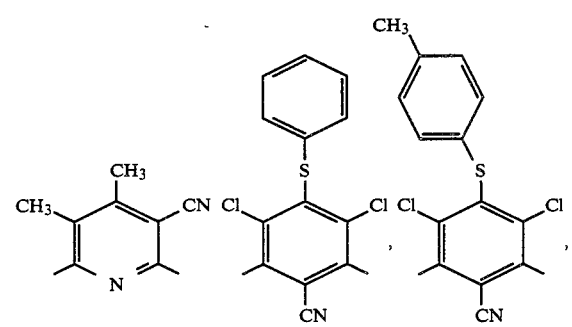

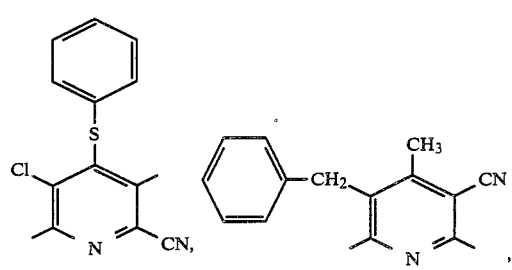

-continued

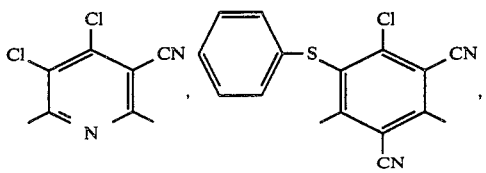

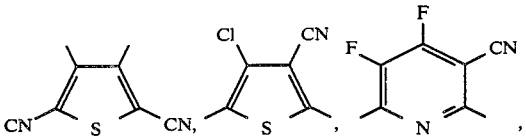

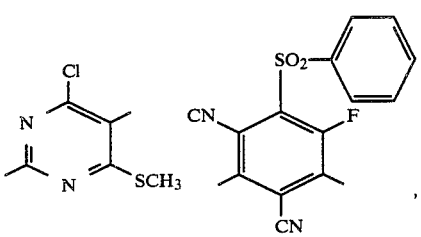

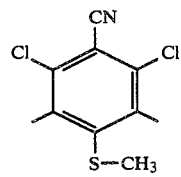

Dinuclear dichloro and difluoro derivatives of the following aromatic compounds are also suitable:

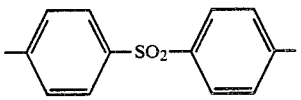

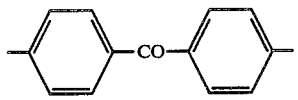

These aromatic polyethers can be prepared by a conventional method. Preferably, about equivalent amounts of diphenol and a dihalo compound are subjected to polycondensation in the presence of an anhydrous alkali metal carbonate, the reaction preferably being carried out in a polar aprotic solvent at from 120° to 200° C. Polyaryl ethers prepared in this manner have a mean degree of polymerization of from 5 to 500, preferably from 50 to 250, and their glass transition temperature is preferably from 140° to 160° C.

Other preferred polymers B are aromatic polysulfide ketones. They are prepared by reacting an aromatic dihalo compound, in which each halogen atom is activated by a keto group in the para-position, with an essentially equivalent amount of an alkali metal sulfide in a polar solvent, preferably in a lactam. Preferred dihalo compounds are those of the general formula

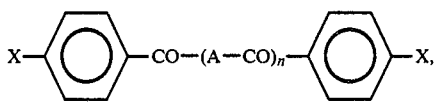

where X is F or CL, p is 0 or 1 and A is an unsubstituted or substituted mononuclear or dinuclear arylene radical.

Particularly preferred molding materials are mixtures of

A. from 98 to 80 parts by weight of a polyether sulfone or polysulfone and

B. from 2 to 20 parts by weight of a polymer of the formula

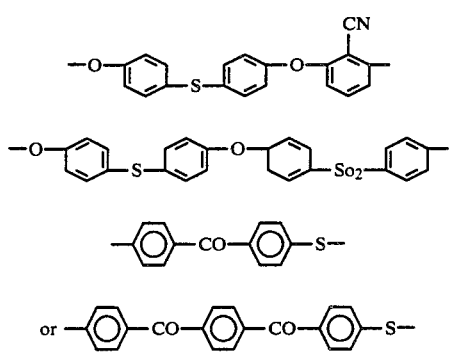

In single-phase mixtures in which the component B is present as a molecular dispersion in the component A, crosslinking of the plastic matrix can take place particularly readily and in this case is virtually complete.

In addition to containing the polymers A and B, the thermoplastic molding materials may furthermore contain conventional additives, such as fillers, dyes, flameproofing agents, stabilizers and catalysts, and preferably contain reinforcing fibers in amounts of from 25 to 300% by weight, based on (A+B).

The novel molding materials can be prepared simply by mixing the polymers A and B in the melt, for example in an extruder or a kneader. It is also possible to mix solutions of the two polymers with one another and to precipitate the polymer from the mixture or directly to process the solution further. The polymers can also be dispersed in water or in another non-solvent, and the two dispersions mixed. Finally, it is also possible to disperse one component in a solution of the other component. In the novel molding material, the two components A and B should be very homogeneously mixed, ie. should form a molecular dispersion.

The molding materials according to the invention are useful for the production of heat-stable and solvent-resistant moldings, for example shaped articles, films, fibers, adhesives and coatings. For this purpose they are first molded, and their plastic matrix is then crosslinked so that it becomes virtually insoluble in low boiling organic solvents; during this procedure, the glass transition temperature of the plastic matrix should preferably increase by not less than 10° C. Crosslinking is advantageously carried out by heating the moldings for not less than 5 minutes, preferably from 1 to 24 hours, at above 200° C., preferably from 250° to 450° C. Crosslinking catalysts, eg. Lewis acids, such as $ZnCl_2$ or $AlCl_3$, oxides, such as $Al_2O_3$ or $Fe_2O_3$, aromatic bisulfides or free radical formers, such as azodicarboxamide, may be present, these being mixed with the molding materials beforehand.

In the Examples which follow, parts and percentages are by weight.

EXAMPLES

10% strength methylene chloride solutions of the polymer

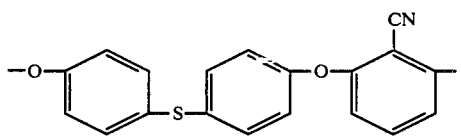

(Tg = 150° C.)

and of a polysulfone (Tg=191° C.) or of a polyether sulfone (Tg=228° C.) were mixed with one another in a ratio A:B of 9:1. The solvent was evaporated, and the pulverulent polymer mixtures obtained were pressed to give sheets. Shear modulus measurements gave only a single glass transition temperature in each case. Accordingly, the mixtures obtained are single-phase systems. The pressed sheets were heated at 300° C. for 24 hours, during which the glass transition temperature increased by 10°-20° C., and the solubility of the moldings in methylene chloride differed from that of the starting polymers.

We claim:

1. A thermoplastic molding material containing a mixture of

A. from 1 to 99 parts by weight of a polymer which does not contain any reactive groups and has a glass transition temperature above 80° C. and B. from 99 to 1 parts by weight of a thermoplastic polymeric material containing reactive groups of the formula

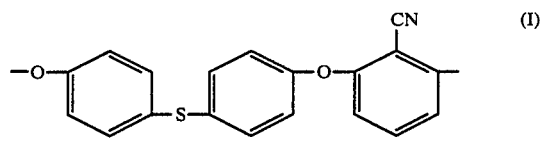

(I)

or of the formula

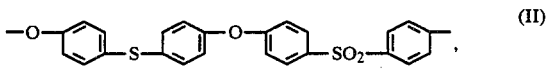

(II)

or of the formula

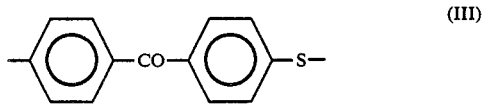

(III)

or of the formula

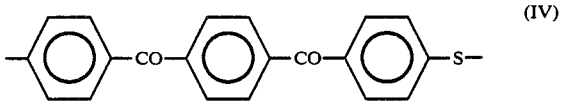

(IV)

said polymeric material having a glass transition temperature above 80° C.

2. The thermoplastic molding material of claim 1, wherein the thermoplastic polymeric material B has a glass transition temperature above 130° C.

3. The thermoplastic molding material of claim 1, wherein the polymer A is polysulfone, a polyetherimide, a polycarbonate or an aromatic polyester.

4. The thermoplastic molding material of claim 1, which contains from 25 to 300 parts by weight of reinforcing fibers per 100 parts by weight of A+B.

5. A process for the production of moldings, wherein the thermoplastic molding material as defined in claim 1 is molded, and the plastic matrix is then crosslinked so that it becomes virtually insoluble in low boiling hydrocarbons.

6. A process for the production of moldings as defined in claim 5, wherein the moldings are heated for not less than 5 minutes at above 200° C. to effect crosslinking.

7. The thermoplastic molding material of claim 1, wherein polymer A is a polyether sulfone.

8. The thermoplastic molding material of claim 1, wherein from 50 to 90% by weight of polymer A is mixed with from 10 to 50% by weight of polymer B.

* * * * *